US009667676B1

(12) United States Patent
Lo et al.

(10) Patent No.: US 9,667,676 B1
(45) Date of Patent: May 30, 2017

(54) REAL TIME COLLABORATION AND DOCUMENT EDITING BY MULTIPLE PARTICIPANTS IN A CONTENT MANAGEMENT SYSTEM

(71) Applicant: Dropbox, Inc., San Francisco, CA (US)

(72) Inventors: Min Ming Lo, San Francisco, CA (US); Michael Wu, San Francisco, CA (US); Shravan Reddy, Fremont, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 15/011,020

(22) Filed: Jan. 29, 2016

(51) Int. Cl.
| G06F 15/16 | (2006.01) |
| H04L 29/06 | (2006.01) |
| H04L 29/08 | (2006.01) |
| G09G 5/08 | (2006.01) |
| G06F 3/14 | (2006.01) |
| G06F 3/0481 | (2013.01) |
| G06F 3/0484 | (2013.01) |

(52) U.S. Cl.
CPC ........ *H04L 65/4015* (2013.01); *G06F 3/0484* (2013.01); *G06F 3/04812* (2013.01); *G06F 3/1454* (2013.01); *G09G 5/08* (2013.01); *H04L 67/104* (2013.01)

(58) Field of Classification Search
CPC .............. G06Q 10/101; H04L 12/1813; H04N 21/4788; H04N 7/15; H04N 1/00973
USPC .......................... 709/204, 205, 227, 230, 231
See application file for complete search history.

(56) References Cited

U.S. PATENT DOCUMENTS

| 6,158,903 | A | * | 12/2000 | Schaeffer | ............ | H04L 67/1095 |
| | | | | | | 709/204 |
| 7,242,389 | B1 | * | 7/2007 | Stern | ....................... | G06Q 10/10 |
| | | | | | | 345/158 |
| 7,328,243 | B2 | * | 2/2008 | Yeager | .................... | H04L 29/06 |
| | | | | | | 707/999.008 |
| 7,769,810 | B1 | * | 8/2010 | Kaufman | ................. | G06F 17/24 |
| | | | | | | 709/205 |
| 7,958,453 | B1 | * | 6/2011 | Taing | .................. | H04L 12/1827 |
| | | | | | | 709/204 |
| 2003/0023679 | A1 | * | 1/2003 | Johnson | ................. | G06F 17/241 |
| | | | | | | 709/204 |
| 2008/0003559 | A1 | * | 1/2008 | Toyama | .................... | G09B 7/02 |
| | | | | | | 434/350 |
| 2011/0252312 | A1 | * | 10/2011 | Lemonik | ............... | G06F 17/248 |
| | | | | | | 715/255 |

(Continued)

*Primary Examiner* — Edward Kim
(74) *Attorney, Agent, or Firm* — Fenwick & West LLP

(57) ABSTRACT

A content management system allows users to collaboratively edit, draft, or otherwise work with the same content item simultaneously by displaying a real-time data stream of a native application displaying a content item on a host device in a screen sharing window of a webpage. The screen sharing window is capable of receiving edit inputs and sending the edit inputs to a client application on the host device. The edit inputs are provided as interpretable code for the native application for the content item and the client application provides the interpretable code to the native application to have the changes corresponding to the edit inputs incorporated into the content item. Further, the cursors of other users participating in the collaborative editing session are displayed in the screen sharing window to allow each participant to view and follow the changes made by the other participants of the session.

20 Claims, 7 Drawing Sheets

(56) References Cited

U.S. PATENT DOCUMENTS

| | | | | |
|---|---|---|---|---|
| 2012/0110445 A1* | 5/2012 | Greenspan | ............... | G06F 17/24 715/256 |
| 2012/0117153 A1* | 5/2012 | Gunasekar | ............ | G06F 17/289 709/204 |
| 2013/0212250 A1* | 8/2013 | Kleppner | ............... | G06Q 10/10 709/224 |
| 2014/0129645 A1* | 5/2014 | Mo | ..................... | G06F 17/2229 709/205 |
| 2014/0245173 A1* | 8/2014 | Knodt | ................... | H04L 65/403 715/748 |

* cited by examiner

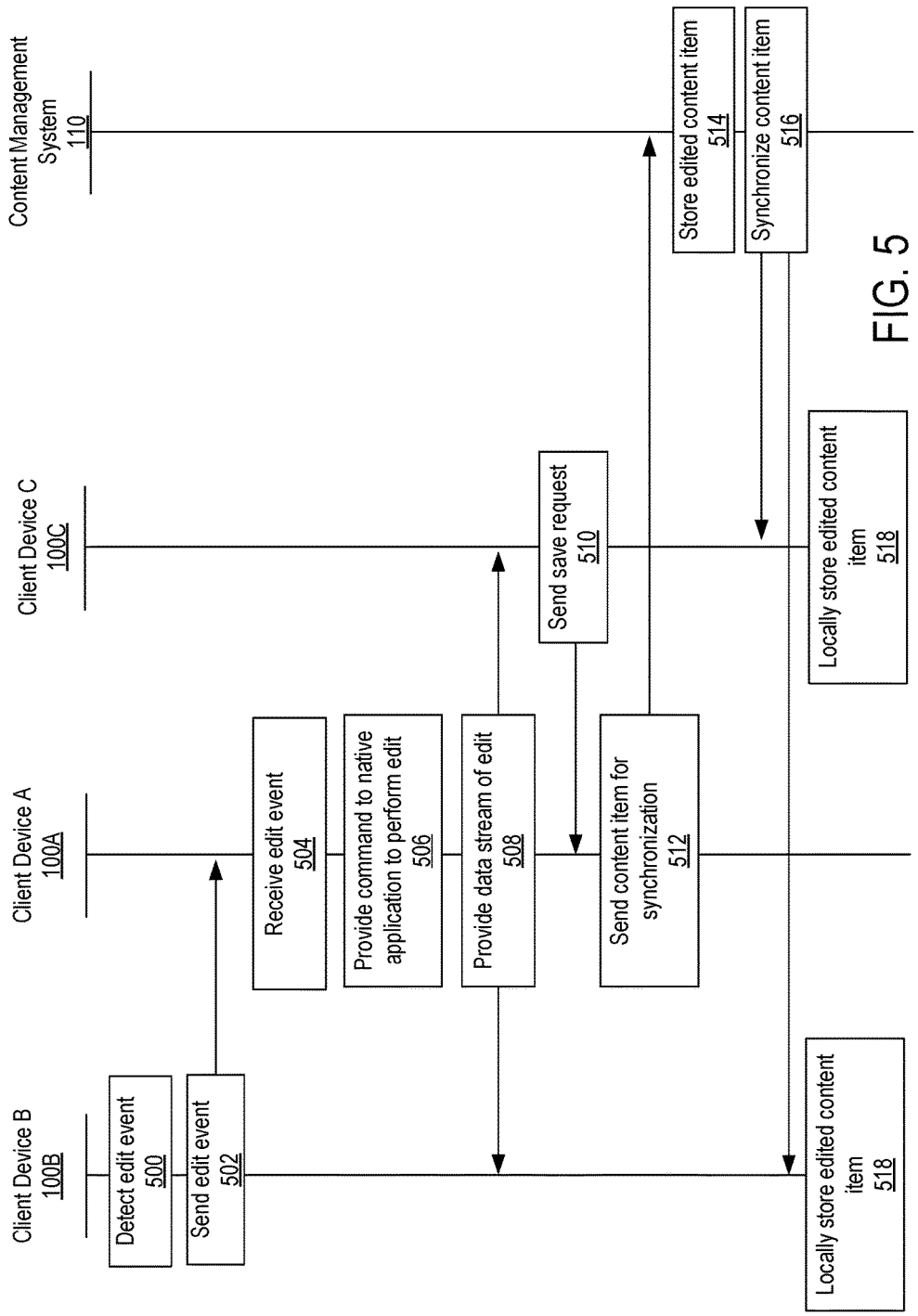

REAL TIME COLLABORATION AND DOCUMENT EDITING BY MULTIPLE PARTICIPANTS IN A CONTENT MANAGEMENT SYSTEM

BACKGROUND

This disclosure relates generally to facilitating content item collaboration, and particularly to allowing multiple users to simultaneously and collaboratively edit content items in content management system.

A content management system permits multiple remotely located client devices to store content items in an online data repository and then synchronize the content items with multiple other devices. A client device stores local copies of content items. When content items are added, deleted, or edited on the client device, these modifications are sent to the content management system for storage and synchronization with other devices. To interact with a content item, users typically execute a native application on the client device to view and modify the content item. Modifications to a content item may be synchronized with the content management system separately from the execution of the native application by transmission of file and block level information for the content item.

Accordingly, multiple users may use respective devices to separately view and edit a particular content item. Typically, such users view and edit their own local copies of the content item; if two or more users are editing a content item the same time, this results in multiple different instances of the content item, rather than a single instances that contains all of the edits from the various users. Even if the multiple users edit the content item at different times to avoid these problems, it is nonetheless difficult for the users identify which changes are made by other users, to determine if they have opened the latest version of the content item, to know if other users have made changes to the content item since they last opened the content item, and so forth, especially if the underlying native application for the content item does not itself support any way of tracking changes. Such an environment where multiple users are separately viewing and editing a content item can lead to confusion and other inefficiencies.

SUMMARY

A content management system (CMS) allows users with user accounts to collaboratively edit, draft, or otherwise work with the same content item simultaneously. A host device has access to a content item that is stored by the CMS. A user of the host device opens the content item in window of a native application for editing the content item. A client application of the CMS also executes on the host device. The host device sends an invitation to or receives a request from one or more remotely located client devices to enter a collaborative editing session to edit the content item. Upon acceptance (of the invitation or request), the client application establishes a bi-directional data channel between the host device and the one or more remotely located client devices. The client application transmits a real-time data stream of the content item open in the native application on the host device over the data channel to a screen sharing window of a web browser on each of the one or more separate and remotely located client devices. The data stream may include data stream, video data, text data, or a combination thereof.

The screen sharing window at each client device receives user inputs corresponding to edits to be made to the content item from a user of that client device. The inputs are translated into a set of interpretable command codes indicating the relative location of each input and its content, (e.g., X, Y location within the screen sharing window, command type and values) and sends the code to the CMS client application on the host device. The CMS client application on the host device receives the command codes, and translates them into native commands of the native application for the content item to execute and thereby incorporate the edits made in the screen sharing window on the client device to the actual content item on the host device. Further, the cursors of other users participating in the collaborative editing session are displayed in each screen sharing window on each of the one or more remotely located client devices to enable each user to view and follow the changes made by the other participants of the session.

In one example, the CMS client application receives a request to open a content item stored in association with a user account at the CMS, and in response the content item is displayed via a native application of the content item on a host device. The host device receives requests from other client devices (or sends invites to the other client devices) to join a collaborative editing session. The requests from the other client devices are provided through a web browser via a webpage and, upon receiving the request, the client application on the host device establishes a peer-to-peer connection with the requesting client device through each device's web browser to initiate the collaborative editing session.

A data stream, such as a series of real-time images or video, of the native application window containing the content item on the host device is transmitted to each participant of the collaborative editing session over the peer-to-peer connection to the web browser of each client device. The real-time data stream of the application window on the host device are displayed in a screen sharing window of for a web page presented by the web browser. Further, the screen sharing window detects and transmits the cursor position of each client device (excluding the host device cursor) when a cursor is within a screen sharing window to the CMS client application. The CMS client application receives coordinates for each cursor from within the screen sharing window and translates the coordinates to reflect the movement and location of the cursor within the native application on the host client device. The translated position of each cursor is subsequently provided to each client device to render each cursor in the transmitted data stream with the content item in the screen sharing window, thereby, allowing each user to follow the changes made to the content item by other user in real-time.

Further, in this example, the CMS client application on the host device receives information for an editing event to the content item; the editing event corresponding to a user participating in the editing session making one or more inputs intended to be made to the content item via the screen sharing window, such as inserting, deleting, or altering data, changing the format of data, or any other content changes These inputs for making one or more changes are received in the screen sharing window as textual or graphical inputs, and then translated into interpretable command codes. For example, if a user types the word "hello" within the content item via screen sharing window, the screen sharing window may encode the input as "var points=[["text", ["hello", 200, 300]]" where "text" indicates a command to enter a text string, where the parameters for the command are the text value "hello" and the coordinate locations pair "200, 300". The coded values for this change are sent to client application of the host device and the client application extracts these codes values, and interprets them as operations or command within the native application. Continuing the above example, the client application would translate the location of "200, 300" to a corresponding location in the native application, accounting for any differences in screen resolution and dimensions, as well as the location of the window of the native application. The client application would provide the input text "hello" to the native application for input into the content item. Thus, although the actual file of the content item is only open on the host device, the other client devices participating in the editing session are able to make changes to the file of the content item via communications between the screen sharing window and the CMS client application of the host device.

BRIEF DESCRIPTION OF THE DRAWINGS

FIG. 5 shows another interaction diagram for content item collaboration, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
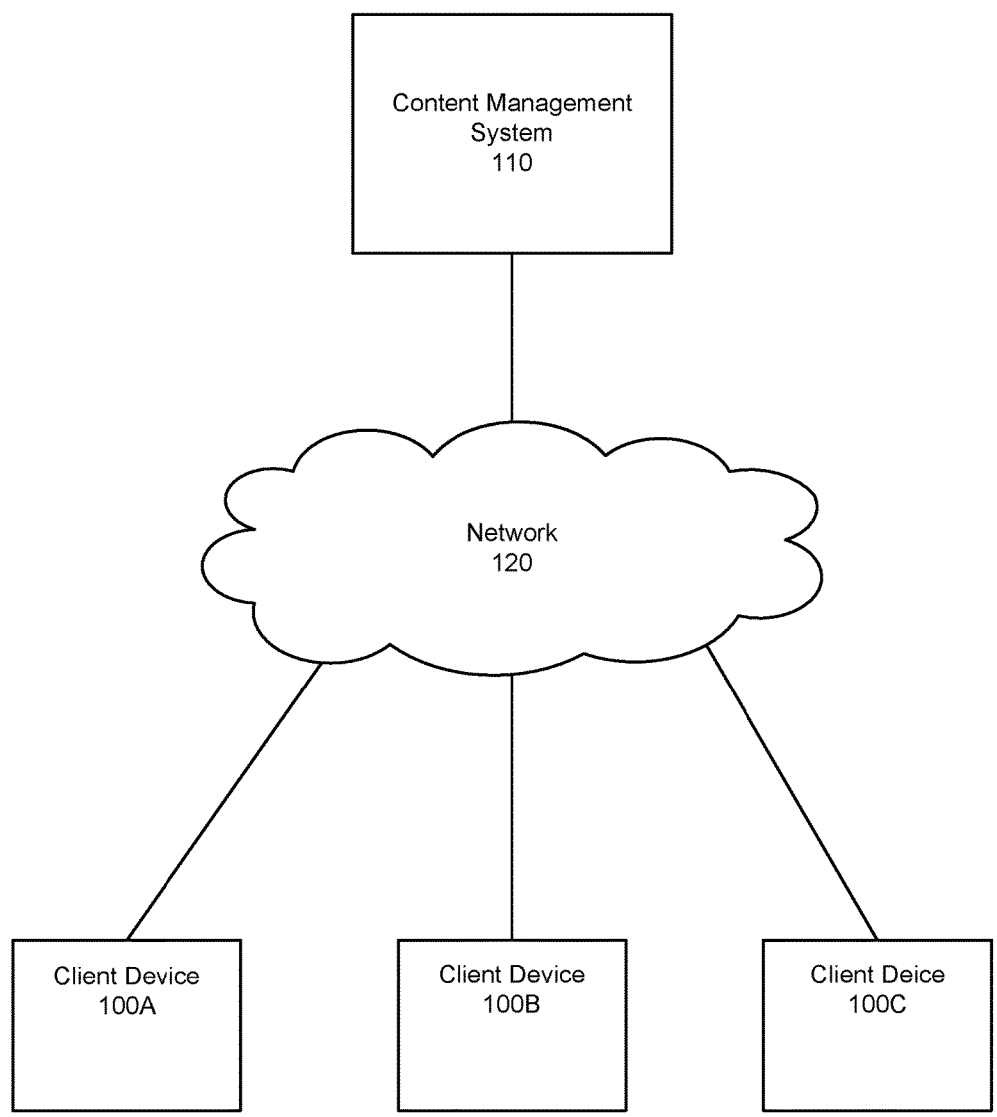
FIG. 1 shows an embodiment of an environment for content item collaboration.

FIG. 1 shows an example system environment for collaborative content item editing. FIG. 1 includes devices 100A, 100B, 100C (referred to generally as device 100), content management system 110, and network 120. Three devices are shown for purpose of illustration; in practice, however, any number of devices may be present in the environment. Similarly, other modules or components described and illustrated throughout may include single or multiple instances as appropriate to the needs of the implementer and without loss of generality.

Device 100 may be any suitable computing device for locally storing and viewing content items and synchronizing the content items with content management system 110. Examples of devices include desktop and laptop computers, hand-held mobile devices, tablet computers, and other computing devices. The operation of device 100 in various embodiments is further described below. In particular, each device 100 is configured by a client application 200 (described with respect to FIG. 2) that extends the operation of the client device 100 beyond the functionality for a generic computer device, as will be further described, and thereby improves the overall functionality of the device 100.

Each device 100 communicates with content management system 110 through network 120. Network 120 is any suitable network and may include local networks, corporate networks, global networks, and any combination of these. In typical configurations, devices 100 communicate via a wired or wireless communication network to a local network service provider, and communicate with content management system 110 through the Internet.

Content management system 110 provides content sharing and synchronization services for users of devices 100. These services allow users to share content with users of other devices 100. In addition to content sharing, content management system 110 updates shared content responsive to changes and enables synchronized changes to content items across multiple devices 100. Users who register with content management system 110 are provided with a user account and a user may synchronize content across multiple devices 100 associated with the user's account, and the user may share content that is synchronized with devices associated with other users' accounts.

Content stored by content management system 110 can include any type of data, such as digital data, documents, media (e.g., images, photos, videos, audio, streaming content), data files and databases, source and object code, recordings, and any other type of data or file, collectively referred to here as "content items." Content items stored by content management system 110 may also be used to organize other content items, such as folders, tables, collections, albums, playlists, or in other database structures (e.g., object oriented, key/value etc.). In practice, various devices 100 will be synchronized with different groups of content items, based on user associations, permissions, content sharing permissions, and so forth. The operation of content management system 110 in various embodiments is further described below.

Figure 2:
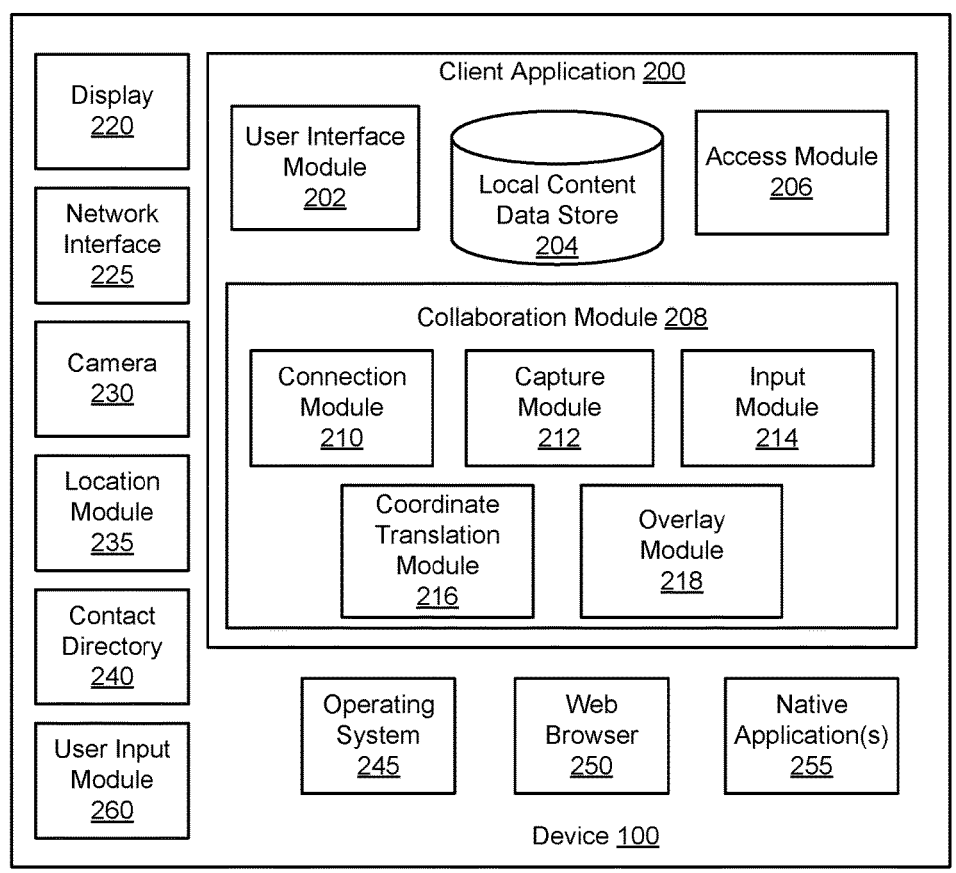
FIG. 2 shows various modules and components of a device, according to one embodiment.

FIG. 2 shows exemplary modules and components of device 100 in accordance with one embodiment. Device 100 includes display 220 for providing information to the user, and in certain client devices 100 includes a touchscreen. Device 100 also includes network interface 225 for communicating with content management system 110 via network 120. Device 100 also includes a user input module 260, which receives user inputs from various user input devices, such as a keyboard, a mouse, or other device. Other conventional components of a client device 100 that are not material are not shown, for example one or more computer processors, local fixed memory (RAM and ROM), as well as optionally removable memory (e.g., SD-card), power sources, and audio-video outputs.

Software modules include operating system 245 and one or more native applications 255. Native applications 255 vary based on client device, and may include various applications for creating, viewing, consuming, and modifying content stored on content management system 110, such as word processors, spreadsheets, database management systems, code editors, image and video editors, e-book readers, audio and video players, and the like. Operating system 245 on each device provides a local file management system and executes the various software modules such as content management system client application 200 and native application 255. A contact directory 240 stores information about the user's contacts, such as name, picture, telephone numbers, company, email addresses, physical address, website URLs, and the like. Further operation of native applications 255, operating system 245, and content management system client application 200 are described below.

In certain embodiments, device 100 includes additional components such as camera 230 and location module 235. Camera 230 may be used to capture images or video for upload to the online content management system 110. Location module 235 determines the location of device 100, using for example a global positioning satellite signal, cellular tower triangulation, or other methods. Location module 235 may be used by client application 200 to obtain location data and add the location data to metadata about a content item, such as an image captured by camera 230.

Client device 100 accesses content management system 110 in a variety of ways. Client application 200 can be a dedicated application or module that provides access to the services of content management system 110, providing both user access to shared files through a user interface, as well as programmatic access for other applications. Client device 100 may also access content management system 110 through web browser 250 by signing into a user account through a content management system webpage. As an alternative, client application 200 may integrate access to content management system 110 with the local file management system provided by operating system 245. When access to content management system 110 is integrated in the local file management system, a file organization scheme maintained at content management system 110 is represented as a local file structure by operating system 245 in conjunction with client application 200. Client application 200 may take various forms, such as a stand-alone application, an application plug-in, a browser extension, and so forth. Client application 200 includes user interface module 202, local content data store 204, access module 206, and collaboration module 208 that includes connection module 210, screen capture module 212, input module 214, coordinate translation module 216, and overlay module 218. The various modules and data stores are described separately throughout this disclosure for convenience and in various implementations may be combined or further divided into separate components as desired. The client application 200 generally, and the various modules specifically, are not conventional or routine elements of generic computing device 100, and thus provide functionality that extends beyond the native generic functions of the computing device 100.

Client application 200 may store content items accessed from a content storage at content management system 110 in local content data store 204. While represented here as within client application 200, local content data store 204 may be stored with other data for client device 100 in non-volatile storage. When local content data store 204 is stored this way, the content is available to the user and other applications or modules, such as native application 255, when client application 200 is not in communication with content management system 110.

Access module 206 manages updates to local content data store 208 and uses synchronization logic to communicate with content management system 110 to synchronize content modified by client device 100 with content maintained on content management system 110, and is one means for performing this function. One example of such synchronization is provided in U.S. Pat. Pub. US20150012488 filed Sep. 27, 2013 and is hereby incorporated by reference in its entirety.

Accordingly, device 100 receives content items from content management system 110, stores such items to local content data store 204, where they may be accessed and edited with various native applications 255 stored on the device 100. For example, device 100 may include a photo editing application that manipulates image content items, a word processing application that permits modification of text content items, or a computer-aided design (CAD) application that permits modification of drawing content items.

Additionally, content management system 110 can share a content item with other users upon user request and provide users with read and write access.

Figure 3:
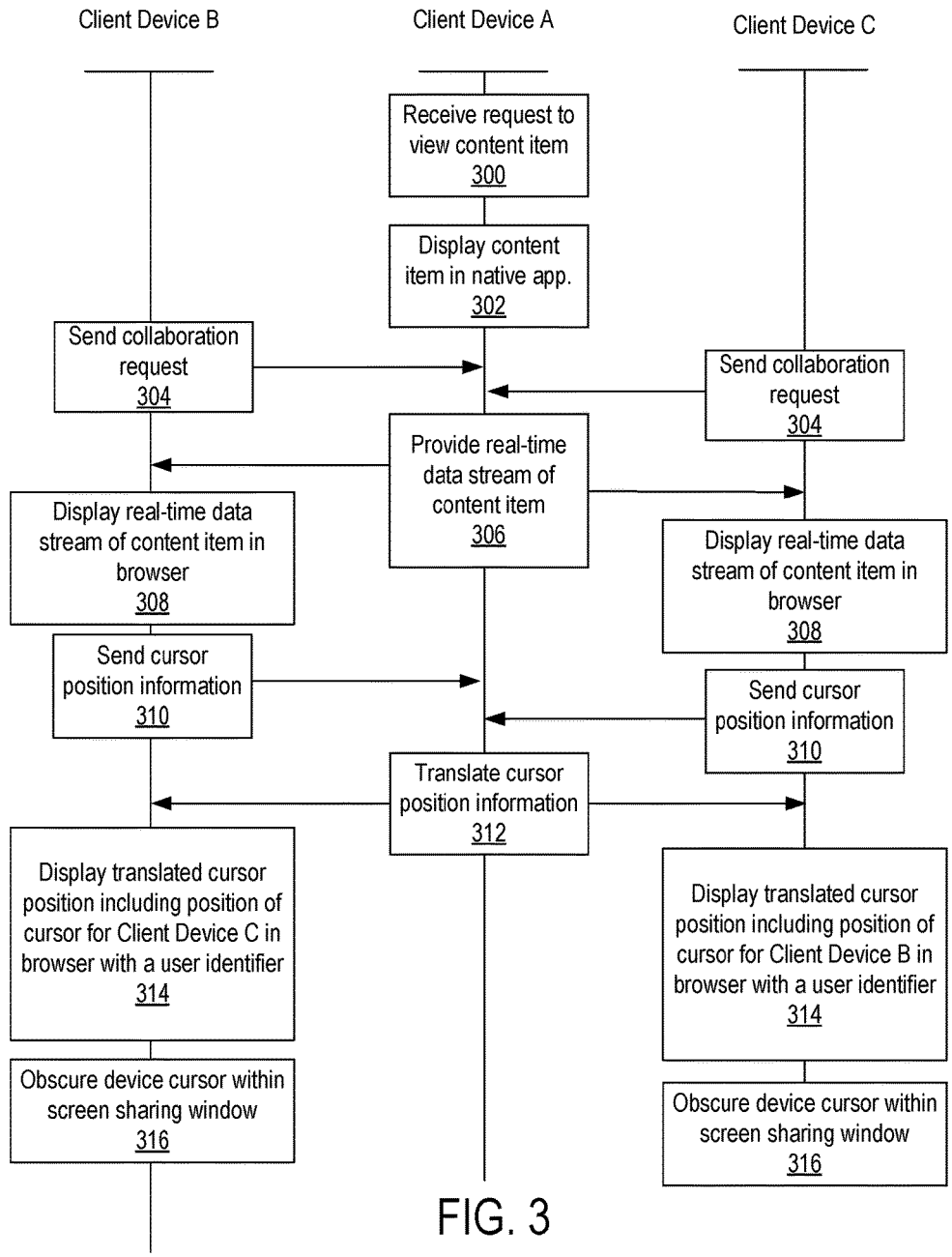
FIG. 3 shows an interaction diagram for content item collaboration, according to one embodiment.

FIG. 3 shows an interaction diagram for facilitating real-time content item collaboration. In this example, a user provides a request to open a content item via a native client application 255 for the content item on client device A. Native application 255 sends a request to launch the content item from a file folder and the content item is displayed 302 on client device A. Subsequently, client device B and client device C send 304 collaboration requests identifying the content item to client device A to initiate a collaborative editing session with client device A as the host device. In this example, client device B and client device C have sent the collaboration request via a web browser from a webpage. Accordingly, client application 200 of client device A receives the collaboration requests and connection module 210 establishes a peer-to-peer connection (P2P) with each web browser of client device B and client device C.

Capture module 212 on host device A captures a real-time data stream of the native application displaying the content item on client device A and provides 306 the data stream, such as a sequence of screen images or video of screen content including the content item to client device B and client device C, or text data over the P2P connection by sending packets of information containing the captured data stream. In this example, the data stream may arrive as image files (JPEGs and GIFs) or encoded video blocks (e.g., MPEG-4 video). In one embodiment, Web Real-Time Communication (WebRTC) is used to establish the P2P connection between devices and additionally capture and send the real-time data stream of the native application on the host device to the other devices.

Figure 4A:
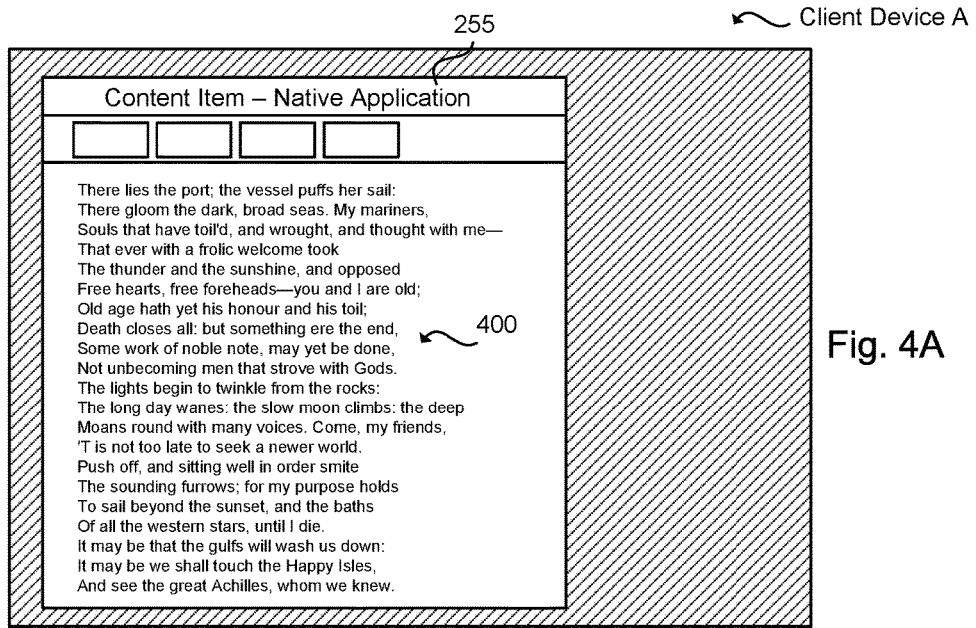
FIGS. 4A and 4B show example screen shots for a host client device providing a real-time data stream of a content item for an additional client device.
Figure 4B:
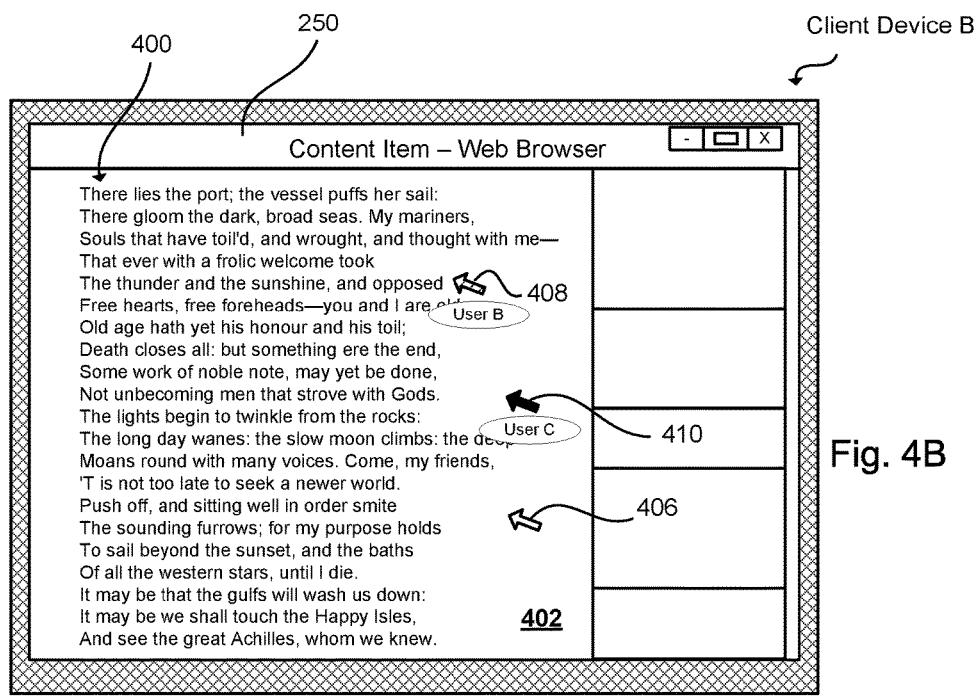

Each client device then displays 308 the received data of the native application displaying the content item in a resizable screen sharing window of a webpage for content management system 110 presented by each web browser 250 of client device B and client device C. FIGS. 4A and 4B show example screen shots of host client device A providing a real-time data stream of native application 255 displaying content item 400 for client device B. In this example, content item 400 is a word processing document and native application 255 displaying content item 400 on host device A is a word processing application. Accordingly, the real-time data stream of content item 400 is displayed in screen sharing window 404 of web browser 250 on client device B (and client device C not shown).

Referring to FIG. 3, client device B sends 310 position information for cursor B to host device A and client device C sends 310 position information for cursor C to host device A. The cursor position information for each client device (excluding host device A) corresponds to the position and movement of the cursor within screen sharing window 404 on client device B and client device C and includes coordinates (e.g., X and Y position) for the cursor within screen sharing window 404. Coordinate translation module 216 of client application 200 on host device A receives the cursor position information from client device B and client device C and translates 312 the position and/or movement information for client device B and client device C from a format (i.e., aspect ratio, size, etc.) of screen sharing window 404 on each device to the format for native application 255 set or defined by host device A. In one example, the position information for cursor B of client device B includes location "580, 620" for cursor B within the screen sharing window on client device B. In this example, if the screen sharing window has a resolution of 1600×900 and the native application on host device A has a resolution of 1680×1050, the location "580, 620" needs to be translated from 580×620 resolution to a 1680×1050 resolution. Performing this calculation, location "580, 620" in screen sharing window 404 translates to "609, 723.33" of the native application. Further, overlay module 218 may generate a device label or identifier for cursor B and cursor C of device B and device C. For example, the device label could be the first name of a user associated with the user account displayed in an overlay to allow other users to know which user is making particular edits or changes to the content item.

Accordingly, the separately translated cursor position information and overlay information for client device B and client device C is sent to both client device B and client device C to reproduce or display 314 the cursors of each device in screen sharing window 404 of client device B and in the screen sharing window of client device C (not shown) with device labels in the real-time data stream of content item 402. Referring to FIG. 4B, cursor 406 corresponds to the cursor of host device A as viewed from the real-time data stream of content item 402, cursor 408 includes a label for "User B" corresponding to the cursor of client device B, and cursor 410 includes a label for "User C" corresponding to the cursor of client device C. In this example, however, content management system 110 has access to the names of the individual users and may display their first and/or last name. Cursor 406 of host device A is captured in the real-time data stream and, since host device A does not include a screen sharing window to detect the location of cursor 406 (i.e., because content item 402 is displayed by native application 255), is not provided with an overlay, in this example. Thus, the translated position information for cursor 408 and cursor 410 is sent to both client device B and client device C for display with the real-time data stream of content item 402 allowing the cursors of all users participating in the collaborative editing session to be simultaneously viewed from the screen sharing widows displayed in the web browser of each device.

Since the translated position information of each cursor is sent to each device for display with the real-time data stream when each cursor is within screen sharing window 404, this results in a viewing user of device B and device C observing two instances of their own cursor; the cursor of their client device and a second instance of the device cursor provided for display with the real-time data stream of the native application. Since the second instance of the device cursor is a displayed reproduction of the device cursor, a delay may result between the two cursors on each device. Thus, in order to prevent the user from observing two versions of their own cursor, the device cursor is obscured 316 or hidden on each device while their cursor is within screen sharing window 404, thereby, only showing the reproduction of the cursor displayed with the real-time data stream to allow the user to focus on the cursor as viewed from the perspective of the host device A.

FIG. 5 shows another interaction diagram for content item collaboration, according to one embodiment. In this example, web browser 250 of client device B provides an edit to content item 402. Screen sharing window 404 presented by web browser 250 of client device B detects 500 an edit event corresponding to user B providing one or more changes to content item 402 on client device B. Since only an image of content item 402 is displayed on client device B, the one or more changes need to be communicated to host device A and made to content item 402 on host device A. Accordingly, information for the edit event, such as the position of the one or more changes within content item 402, the nature of the changes (i.e., deleting or adding text if content item is a word processing document, etc.) in the semantics of native application 255, and so forth, are sent 502 to host device A to incorporate the changes. In one example, if the word "Thank you" is typed into screen sharing window 404 corresponding to a location within content item 402, screen sharing window 404 records the edit event as interpretable codes, such as "var points= [["text", ["Thank you", 750, 520]]," where "750, 520" refers to the location of the newly added text "Thank you". The interpretable codes for this change are sent to client application 200 of host device A over the peer to peer connection. Thus, client application 200 receives "var points=[["text", ["Thank you", 750, 520]]," but must translate this code into a command that can be executed by native application 255. Client application 200 of host device A receives 504 the edit event information, coordinate translation module 216 translates the coordinates for the new text to a location within native application 255 corresponding to "750, 520" (i.e., "787.50, 606.67"), and input module 214 identifies the application associated with content item 402 to determine which commands to provide, translates the interpretable codes into a command for the identified native application, and provides the command for the edit event with the translated coordinates to identified native application 255 on host device A to make the corresponding one or more changes to content item 402. Thus, "text" tells client application 200 that the input is a text value and the translated location "787.50, 606.67" is where "Thank you" is inserted.

Further, the cursor position information and translation of the position information from each device to the host device A is not just for knowing where to display the cursor within content item 402 to each device; the translated cursor position information identifies the location of each input to client application 200. For example, a user moves the cursor with a mouse and selects a location within content item 402 (via screen sharing window 404) to drop the input point or cursor to add text at that location. This location is associated with a coordinate location that must be mapped to the proper input point. In one example, client application receives the interpretable codes from screen sharing window 404 and, for each code, extracts a data type (e.g., text, line, rect, etc.), coordinates, and a value (e.g., "hello"). Client application 200 determines a native application command for the extracted data type, maps or translates the received coordinates into coordinates in the native window, and causes the command with the indicated value to be executed by the native application at the location.

Although the file of content item 402 is only open on host device A, client devices B and C participating in the editing session are able to make changes to the file of content item 402. Thus, changes provided to content item 402 via a screen sharing interface (i.e., screen sharing window 404) are made to the file of content item 402 via communications between screen sharing window 404 simultaneously provided on each of client devices B and C and client application 200 of host device A over the peer to peer connection. As discussed above, capture module 212 on host device A captures real-time data stream of content item 402 and simultaneously provides an image of the content item separately to client device B and client device C. Capturing the data stream of content item 402 and providing the same to client device B and client device C can be continuous, provided in response to changes, or only portions of content item 402 associated with changes or cursor movement can be provided to minimize bandwidth usage. Thus, in this example, host device A provides 508 real-time data stream of the edit to client device B and client device C. Accordingly, in this example, User B of client device B would observe (reproduced) cursor 408 make the one or more changes to content item 402 in real-time as screen sharing window 404 detects the one or more changes, sends information for those changes (e.g., native application 255 instructions) to client application 200 of host device A, which sends instructions for those changes to native application 255 for the instructions to be executed on content item 402. Thus, content item 402 is only open on host device A and client devices B and C can provide changes to content item 402 via the communication between screen sharing window 404 of the content management system webpage and client application 200. Screen sharing window 404, thus, displays an image of content item 402, receives edit input semantics for native application 255, sends the edits in the form of instructions to client application 200 on host device A, and client application 200 provides the instructions to native application 255 of content item 402 to execute the instructions, thus, incorporating the one or more changes. Similarly, User C of client device C would observe cursor 408 make the one or more changes via the real-time image of content item 402 displayed in screen sharing window 404 of client device C. Thus, as used herein, real-time content item collaboration is the simultaneous editing or viewing of a content item remotely hosted by a host client device where other devices are able to make edits or other changes to the content item on the host machine via their own client device.

In this example, client device C via screen sharing window 404 provides an input to save the one or more changes or edits to content item 402. Thus, screen sharing window 404 detects the input to save (i.e., receives a mouse selection input at a location within screen sharing window 404 corresponding to a "save" button or icon of native application 255) and sends 510 a save request to host device A. The request is received by client application 200 and input module 214 sends a save input to native application 255. Accordingly, host device A locally stores edited content item 402 and sends 512 edited content item 402 to content management system 110 for synchronization. Content management system receives and stores 514 the edited content item 402. Further, content management system 110 synchronizes content item 402 with each device and/or user account maintaining a copy of content item 402 locally. Thus, in this example, content management system 110 synchronizes content item 402 by sending client device B and client device C information to update the locally stored version of content item 402. In this example, though users B and C are participating in the collaborative editing session via the webpage of content management system 110, client device B and client device C have client application 200 installed thereon to receive the synchronization update and locally store the new edits made to content item 402 by user B and saved by user C. Thus, in this example, the edited content item is locally stored 518 on client devices B and C. Although discussed within an environment managed by a content management system, it should be understood that the embodiments discussed herein can be provided as a standalone application.

Embodiments of the present disclosure, thus, allow application sharing to remotely view and control a particular content item being hosted by a host user. Further, the remote users can run software or an application that is not installed on their device or compatible with their operating system since each user (other than the host) is viewing an image of the content item and interacting with the content item though a screen sharing window provided though a webpage of content management system 110.

Figure 6:
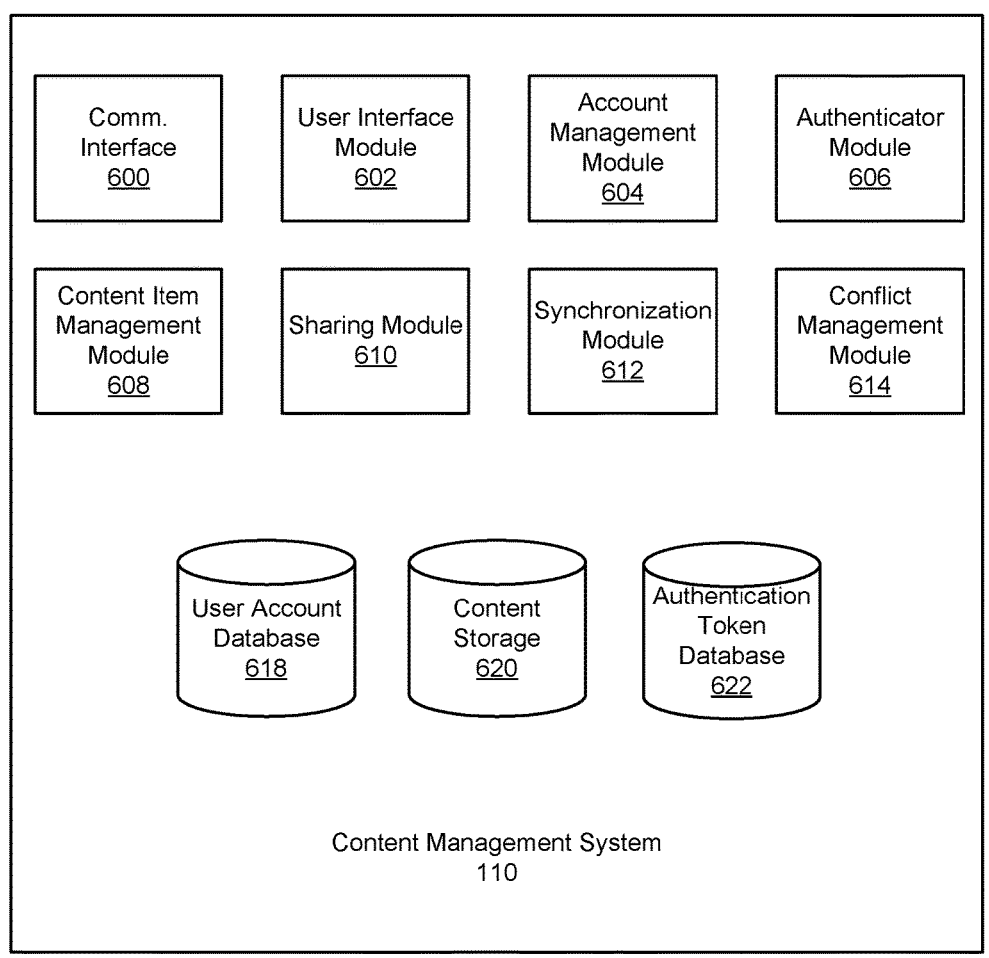
FIG. 6 shows components of a content management system, according to one embodiment.
Figure 7:
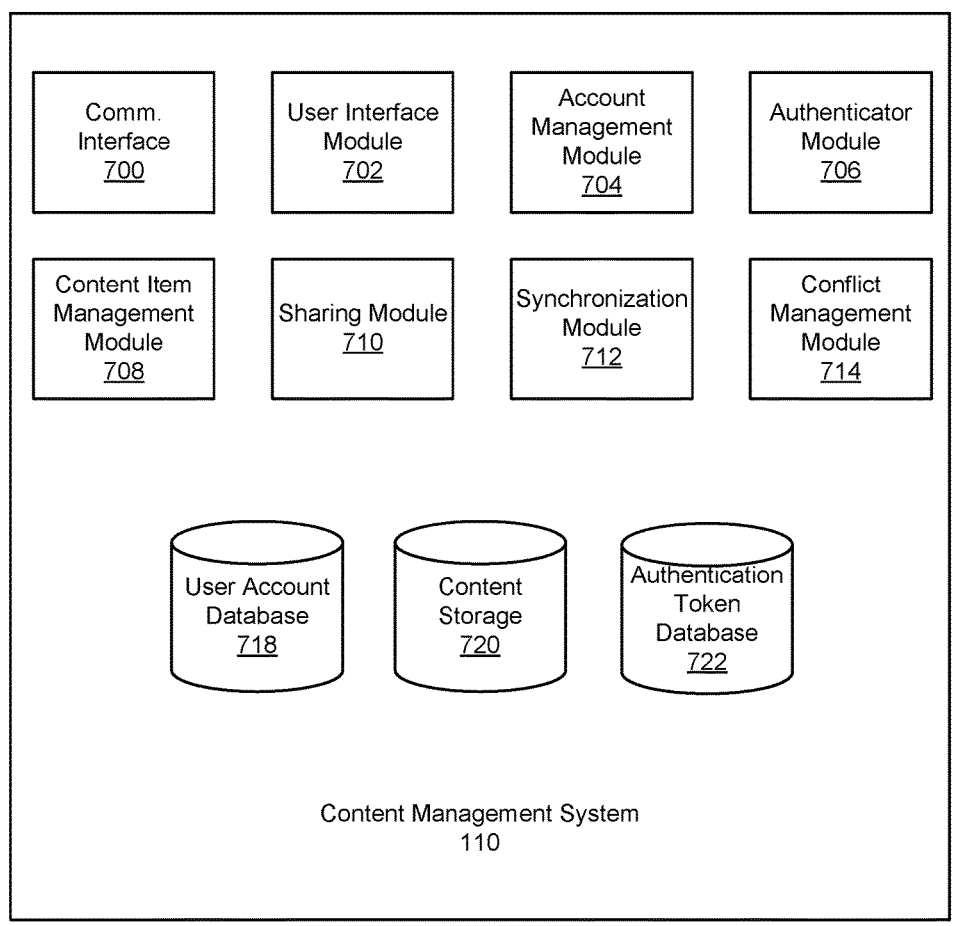

FIG. 6 shows components of content management system 110 of FIG. 1, according to one embodiment. In one configuration, components described below with reference to content management system 110 are incorporated into devices 100 that share and synchronize content items without management by content management system 110. These devices 100 may synchronize content and share interaction information over network 120 or via a direct connection as described above. In this configuration, devices 100 may incorporate functionality of synchronization module 612, conflict management module 614, and other modules and data stores for incorporating functionality described below as provided by content management system 110. Accordingly, devices 100 in this configuration operate in a peer-to-peer configuration and may do so without content management system 110 or network 120.

When using content management system 110, to facilitate the various content management services, a user can create an account with content management system 110. The account information can be maintained in user account database 618, and is one means for performing this function. User account database 618 can store profile information for registered users. In some cases, the only personal information in the user profile can be a username and/or email address. However, content management system 110 can also be configured to accept additional user information, such as password recovery information, demographics information, payment information, and other details. Each user is associated with an identifier, such as a user ID or a user name.

User account database 618 can also include account management information, such as account type, e.g., free or paid; usage information for each user, e.g., file edit history; maximum storage space authorized; storage space used; content storage locations; security settings; personal configuration settings; content sharing data; etc. Account management module 604 can be configured to update and/or obtain user account details in user account database 618. Account management module 604 can be configured to interact with any number of other modules in content management system 110.

An account can be associated with multiple devices 100, and content items can be stored in association with an account. The stored content can also include folders of various types with different behaviors, or other content item grouping methods. For example, an account can include a public folder that is accessible to any user. The public folder can be assigned a web-accessible address. A link to the web-accessible address can be used to access the contents of the public folder. In another example, an account can include a photo folder that is intended for photo content items and that provides specific attributes and actions tailored for photos; an audio folder that provides the ability to play back audio file content items and perform other audio related actions; or other special purpose folders. An account can also include shared folders or group folders that are linked with and available to multiple user accounts. The permissions for multiple users may be different for a shared folder. In one embodiment, the account is a namespace that may be associated with several users, each of whom may be associated with permissions to interact with the namespace.

The content can be stored in content storage 620, which is one means for performing this function. Content storage 620 can be a storage device, multiple storage devices, or a server. Alternatively, content storage 620 can be a cloud storage provider or network storage accessible via one or more communications networks. In one configuration, content management system 110 stores the content items in the same organizational structure as they appear on the device. However, content management system 110 can store the content items in its own order, arrangement, or hierarchy.

Content storage 620 can also store metadata describing content items, content item types, and the relationship of content items to various accounts, folders, or groups. The metadata for a content item can be stored as part of the content item or can be stored separately. In one configuration, each content item stored in content storage 620 can be assigned a system-wide unique identifier.

Content storage 620 can decrease the amount of storage space required by identifying duplicate content items or duplicate segments of content items. In one embodiment, for example, a content item may be shared among different users by including identifiers of the users within ownership metadata of the content item (e.g., an ownership list), while storing only a single copy of the content item and using pointers or other mechanisms to link duplicates with the single copy. Similarly, content storage 620 stores content items using a version control mechanism that tracks changes to content items, different versions of content items (such as a diverging version tree), and a change history. The change history includes a set of changes that, when applied to the original content item version, produces the changed content item version.

Content management system 110 automatically synchronizes content items from one or more devices, using synchronization module 612, which is one means for performing this function. The synchronization is platform-agnostic. That is, the content items are synchronized across multiple devices 100 of varying type, capabilities, operating systems, etc. For example, client application 200 synchronizes, via synchronization module 612 at content management system 110, content in the file system of device 100 with the content items in an associated user account on system 110. Client application 200 synchronizes any changes to content items in a designated folder and its sub-folders with the synchronization module 612. Such changes include new, deleted, modified, copied, or moved files or folders. Synchronization module 612 also provides any changes to content associated with device 100 to client application 200. This synchronizes the local content at device 100 with the content items at content management system 110.

Conflict management module 614 determines whether there are any discrepancies between versions of a content item located at different devices 100. For example, when a content item is modified at one device and a second device, differing versions of the content item may exist at each device. Synchronization module 612 determines such versioning conflicts, for example by identifying the modification time of the content item modifications. Conflict management module 614 resolves the conflict between versions by any suitable means, such as by merging the versions, or by notifying the device of the later-submitted version.

A user can also view or manipulate content via a web interface generated by user interface module 602. For example, the user can navigate in web browser 250 to a web address provided by content management system 110. Changes or updates to content in content storage 620 made through the web interface, such as uploading a new version of a file, are synchronized back to other devices 100 associated with the user's account. Multiple devices 100 may be associated with a single account and files in the account are synchronized between each of the multiple devices 100.

Content management system 110 includes communications interface 600 for interfacing with various devices 100, and with other content and/or service providers via an Application Programming Interface (API), which is one means for performing this function. Certain software applications access content storage 620 via an API on behalf of a user. For example, a software package, such as an app on a smartphone or tablet computing device, can programmatically make calls directly to content management system 110, when a user provides credentials, to read, write, create, delete, share, or otherwise manipulate content. Similarly, the API can allow users to access all or part of content storage 620 through a web site.

Content management system 110 can also include authenticator module 606, which verifies user credentials, security tokens, API calls, specific devices, etc., to determine whether access to requested content items is authorized, and is one means for performing this function. Authenticator module 606 can generate one-time use authentication tokens for a user account. Authenticator module 606 assigns an expiration period or date to each authentication token. In addition to sending the authentication tokens to requesting devices, authenticator module 606 can store generated authentication tokens in authentication token database 622. Upon receiving a request to validate an authentication token, authenticator module 606 checks authentication token database 622 for a matching authentication token assigned to the user. Once the authenticator module 606 identifies a matching authentication token, authenticator module 606 determines if the matching authentication token is still valid. For example, authenticator module 606 verifies that the authentication token has not expired or was not marked as used or invalid. After validating an authentication token, authenticator module 606 may invalidate the matching authentication token, such as a single-use token. For example, authenticator module 606 can mark the matching authentication token as used or invalid, or delete the matching authentication token from authentication token database 622.

Content management system 110 includes a sharing module 610 for sharing content publicly or privately. Sharing content publicly can include making the content item accessible from any computing device in network communication with content management system 110. Sharing content privately can include linking a content item in content storage 620 with two or more user accounts so that each user account has access to the content item. The content can also be shared across varying types of user accounts.

In some embodiments, content management system 110 includes a content management module 608 for maintaining a content directory that identifies the location of each content item in content storage 620, and allows client applications to request access to content items in the storage 620, and which is one means for performing this function. A content entry in the content directory can also include a content pointer that identifies the location of the content item in content storage 620. For example, the content entry can include a content pointer designating the storage address of the content item in memory. In some embodiments, the content entry includes multiple content pointers that point to multiple locations, each of which contains a portion of the content item.

In addition to a content path and content pointer, a content entry in some configurations also includes a user account identifier that identifies the user account that has access to the content item. In some embodiments, multiple user account identifiers can be associated with a single content entry indicating that the content item has shared access by the multiple user accounts.

To share a content item privately, sharing module 610 adds a user account identifier to the content entry associated with the content item, thus granting the added user account access to the content item. Sharing module 610 can also be configured to remove user account identifiers from a content entry to restrict a user account's access to the content item.

To share content publicly, sharing module 610 generates a custom network address, such as a URL, which allows any web browser to access the content in content management system 110 without any authentication. The sharing module 610 includes content identification data in the generated URL, which can later be used by content management system 110 to properly identify and return the requested content item. For example, sharing module 610 can be configured to include the user account identifier and the content path in the generated URL. The content identification data included in the URL can be transmitted to content management system 110 by a device to access the content item. In addition to generating the URL, sharing module 610 can also be configured to record that a URL to the content item has been created. In some embodiments, the content entry associated with a content item can include a URL flag indicating whether a URL to the content item has been created.

Content management system 110 may be implemented using a single computer, or a network of computers, including cloud-based computer implementations. For the purposes of this disclosure, a computer is device having one or more processors, memory, storage devices, and networking resources. The computers are preferably server class computers including one or more high-performance CPUs and 1G or more of main memory, as well as 500 Gb to 2 Tb of computer readable, persistent storage, and running an operating system such as LINUX or variants thereof. The operations of content management system 110 as described herein can be controlled through either hardware or through computer programs installed in computer storage and executed by the processors of such server to perform the functions described herein. These systems include other hardware elements necessary for the operations described here, including network interfaces and protocols, input devices for data entry, and output devices for display, printing, or other presentations of data, but which are not described herein. Similarly, conventional elements, such as firewalls, load balancers, failover servers, network management tools and so forth are not shown so as not to obscure the features of the system. Finally, the functions and operations of content management system 110 are sufficiently complex as to require implementation on a computer system, and cannot be performed in the human mind simply by mental steps.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented by a combination of hardware and software modules, alone or in combination with other devices. In one embodiment, a software module is implemented with a computer program product comprising a non-transitory computer-readable medium containing computer program code, which can be executed by a computer processor for performing any or all of the steps, operations, or processes described.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving a request to open a content item stored in association with a user account at a content management system (CMS), the request being received by a client application associated with the CMS installed on a client device, the content item being displayed via a native application associated with the content item on the client device;
   establishing, by the client application, a peer-to-peer connection with at least one second client device to initiate a collaborative editing session to edit the content item with the at least one second client device;
   responsive to the peer-to-peer connection being established, sending a real-time data stream of the content item to the at least one second client device, the real-time data stream being presented on a screen sharing window within a webpage associated with the CMS displayed on the at least one second client device, wherein transmitting the real-time data stream of the content item to the at least one second client device establishes the client device as a host client device for the collaborative editing session;
   receiving, by the client application, instructions from the at least one second client device that when executed by the native application on the host client device cause the native application to apply one or more changes to the content item, the instructions corresponding to a user of the at least one second client device making the one or more changes to the content item via the sharing window, wherein the instructions do not include an updated content item with the one or more changes applied thereto; and
   providing, by the client application, the instructions to the native application to apply the one or more changes to the content item on the host client device.

2. The method of claim 1, further comprising:
   receiving, by the client application, a request to save the content item with the one or more changes; and
   causing, by the client application, the content item with the one or more changes to be saved at the CMS from the host client device, the CMS further synchronizing the content item to a local copy of the content item stored in association with the at least one second user account on the at least one second client device.

3. The method of claim 1, further comprising:
receiving, from the at least one second client device, position information for at least one cursor within the screen sharing window over the peer to peer connection;
translating, by the client application, the position information to correspond to a location of the at least one cursor within the native application on the host client device; and
providing the translated position information to the at least one second client device for display in the screen sharing window with the real-time data stream of the content item.

4. The method of claim 3, further comprising:
generating a cursor overlay identifying a user of the at least one second client device, the cursor overlay being presented adjacent the cursor in the screen sharing window with the real-time data stream of the content item; and
providing the cursor overlay to the at least one second client device.

5. The method of claim 1, further comprising:
receiving, by the client application, a request to join the collaborative editing session by the at least one second client device, the request being provided through the webpage associated with the CMS,
wherein the peer-to-peer connection is established in response to the client application receiving an acceptance command provided by a user of the host client device.

6. The method of claim 1, further comprising:
sending, by the client application, an invitation to join the collaborative editing session to the at least one second client device,
wherein the peer-to-peer connection is established in response to the at least one second client device accepting the invitation.

7. The method of claim 1, wherein the instructions are a set of interpretable codes for the native application to perform the one or more changes, and wherein the one or more changes to the content item are displayed in the real-time data stream of the content item presented on the at least one second client device via the screen sharing window.

8. A method comprising:
establishing, by a client application of a first client device, a peer-to-peer connection with a second client device to initiate a collaborative editing session to edit a content item with the second client device, the first client device being associated with a first user account and the content item being provided on the first client device via a native application of the content item;
sending a real-time data stream of a content item to the at least one second client device over the peer-to-peer connection, the real-time data stream being presented on a screen sharing window within a webpage associated with a second user account displayed on the second client device;
receiving, by the client application, interpretable code for one or more changes to the content item being made via the sharing window on the second client, wherein the interpretable code does not include an updated content item with the one or more changes applied thereto; and
providing, by the client application, a command corresponding to the interpretable code to the native application on the first client device for the native application to apply the one or more changes to the content item on the first client device.

9. The method of claim 8, further comprising:
receiving, from the second client device, position information for a second cursor within the screen sharing window;
translating, by the client application, the position information to correspond to a location of the second cursor within the native application on the first client device; and
providing the translated position information to the second client device for display in the screen sharing window with the real-time data stream of the content item.

10. The method of claim 9, further comprising:
receiving second position information for a third cursor from a third client device participant to the collaborative editing session;
translating, by the client application, the second position information to correspond to a location of the third cursor within the native application; and
providing the second translated position information to the second client device and the third client device to display the third cursor in the screen sharing window,
wherein the second cursor and the third cursor are simultaneously displayed with the real-time data stream of the content item displayed in the screen sharing window.

11. The method of claim 10, further comprising:
determining a cursor overlay identifying a second user of the second client device and a third cursor overlay identifying a third user of the third client device, the second cursor overlay and the third cursor overlay being presented adjacent each cursor in the screen sharing window with the real-time data stream of the content item; and
providing the second cursor overlay and the third cursor overlay to the second client device and the third client device.

12. The method of claim 8, further comprising:
receiving, by the client application, a request to join the collaborative editing session by the second client device, the request being provided through the webpage associated with the second user account,
wherein the peer-to-peer connection is established in response to the client application receiving an acceptance command provided by a user of the host client device.

13. The method of claim 8, wherein the one or more changes to the content item are displayed in the real-time data stream of the content item presented on the second client device via the screen sharing window.

14. The method of claim 13, further comprising:
capturing, by the client application, the real-time data stream of the content item displayed by the native application on the first client device, wherein the first client device is a host client device for the content item.

15. A non-transitory computer-readable storage medium storing instructions that, when executed by at least one processor, cause a computing device to:
present, via a web browser of a client device, a webpage for a content management system (CMS) for display, the webpage providing access to one or more content items associated with a first user account stored with the CMS;

send a request to join a collaborative editing session to edit a content item of the one or more content items with one or more additional client devices including a host client device, the content item being displayed by the host client device via a native application associated with the content item, wherein a CMS client application associated with a second user account with the CMS is installed on the host client device;

establish, via the web browser, a peer-to-peer connection with the CMS client application of the host client device to join the collaborative editing session;

responsive to establishing the peer-to-peer connection, present a screen sharing window within the webpage, the screen sharing window displaying a real-time data stream of the native application displaying the content item received over the peer-to-peer connection from the host client device; and responsive to a cursor of the client device being detected within the screen sharing window, send position information for the cursor within the screen sharing window over the peer-to-peer connection to the CMS client application, the CMS client application receiving the position information and translating the position information to a location of the cursor within the native application on the host client device;

receive, from the CMS client application on the host client device, the translated position information for the location of the cursor within the native application on the host client device;

present a reproduction of the cursor corresponding to the translated position information for display in the screen sharing window with the real-time data stream of the native application displaying the content item; and responsive to detecting an editing event corresponding to a user of the client device making an edit to the content item via the screen sharing window, send native application interpretable code for the editing event to the CMS client application on the host client device, the CMS client application providing the native application interpretable code to the native application to perform the edit to the content item on the host client device, wherein the interpretable code does not include an updated content item with the one or more changes applied thereto.

16. The non-transitory computer-readable storage medium of claim 15, wherein the instructions, when executed by the at least one processor, further cause the computing device to:

receive second translated position information for a second cursor corresponding to an additional client device participant to the collaborative editing session; and present the second translated position information of the second cursor for display in a screen sharing window, the second translated position information corresponding a location of the second cursor within the native application of the content item, wherein a third cursor of the host client device is viewable via the real-time data stream of the content item displayed in the screen sharing window.

17. The non-transitory computer-readable storage medium of claim 15, where the CMS client application of the host client device transmits the translated position information to at least one additional client device participant to the collaborative editing session, the location of the cursor within the content item is displayed in a screen sharing window of the at least one additional client device participant to the collaborative editing session.

18. The non-transitory computer-readable storage medium of claim 15, wherein the one or more changes to the content item are displayed in the real-time data stream of the content item presented on the at least one additional client device participant to the collaborative editing session via the screen sharing window.

19. The non-transitory computer-readable storage medium of claim 15, wherein the instructions, when executed by the at least one processor, further cause the computing device to:

receive, from the host client device, an invitation to join the collaborative editing session.

20. The non-transitory computer-readable storage medium of claim 15, wherein the instructions, when executed by the at least one processor, further cause the computing device to:

send a request to the host client device to join the collaborative editing session, wherein the peer-to-peer connection is established in response to the host client device accepting the request.

* * * * *